United States Patent [19]

Flisberg et al.

[11] 4,259,713
[45] Mar. 31, 1981

[54] HIGH VOLTAGE DIRECT CURRENT TRANSMISSION

[75] Inventors: Gunnar Flisberg; Lars-Erik Juhlin, both of Ludvika, Sweden

[73] Assignee: ASEA Aktiebolag, Vesteras, Sweden

[21] Appl. No.: 14,011

[22] Filed: Feb. 21, 1979

[30] Foreign Application Priority Data

Feb. 21, 1978 [SE] Sweden ................................. 7801966

[51] Int. Cl.³ .............................................. H02J 3/36
[52] U.S. Cl. .................................................... 363/35
[58] Field of Search ...................... 307/82, 151; 363/34, 363/35, 37, 51, 62

[56] References Cited

U.S. PATENT DOCUMENTS 4,151,585  4/1979  Bowles .................................. 363/35

Primary Examiner—William M. Shoop
Attorney, Agent, or Firm—Pollock, Vande Sande & Priddy

[57] ABSTRACT

Improved apparatus for discharging power from a high-voltage direct current line. A direct voltage convertor is connected in series with a smoothing filter and a DC high voltage line on one side and a second smoothing filter and a power discharge inverter on the other side. The rated voltage of the discharge inverter is substantially lower than the line voltage and the direct voltage convertor applies the lower voltage to the discharge inverter.

8 Claims, 6 Drawing Figures

HIGH VOLTAGE DIRECT CURRENT TRANSMISSION

BACKGROUND OF THE INVENTION

The invention relates to an improved transmission apparatus for high-voltage direct current and, more particularly, to such an apparatus including means for utilizing an inverter operating at a lower voltage than the line voltage of the system to discharge power from the DC line.

In a high voltage DC transmission system, there is typically a rectifier station and an associated inverter station that are connected to a high voltage transmission line having a particular high DC line voltage. In order to discharge energy from the high voltage DC line, it has been necessary to utilize an energy discharge station having an inverter that is dimensioned to operate with the full DC line voltage.

In such prior art systems, such an energy discharge has therefore, only been practical where the power of discharge is of the same order of magnitude as the power associated with the other stations in the system. It has heretofore not been practicable to utilize an inverter for such an energy discharge system having full voltage and lower power.

Accordingly, it is an object of the invention to provide an effective means for operating an energy discharge station for a high voltage DC transmission system with an inverter operating at a direct voltage that is substantially less than the line voltage.

A further object of the invention is to provide a pulse-controlled DC voltage convertor for reducing the line voltage in the discharge station to a level that is reasonable with regard to the desired lower inverter power.

Although DC voltage convertors having pulse-controlled valves and turn-off circuits have been known to the art for low-voltage applications, such convertors have not typically been used for high voltage applications.

Therefore, another object of the invention is to provide a DC voltage convertor that is adapted to operate at high input voltages and to generate a lower output voltage for operation with a lower power discharge thyristor.

A further object of the invention is to provide such a DC voltage convertor that prevents line disturbances from propagating between the DC line and the discharge inverter.

These and other objects of this invention will become apparent from a review of the detailed specification that follows and a consideration of the accompanying drawings in which like reference characters identify identical apparatus.

BRIEF SUMMARY OF THE INVENTION

In order to achieve the objects of the invention and to overcome the problems of the prior art, the improved transmission apparatus for high voltage direct current, according to the invention, includes at least one rectifier station and one inverter station connected on a DC line having a particular line voltage and a discharge station that is used to discharge power from the DC line.

The discharge station includes a DC voltage convertor that is used to reduce the voltage of the DC line and to apply the lower voltage to a power discharge inverter that is adapted to operate at a relatively lower rated power.

The apparatus of the invention may include a first DC filter means connected between the DC line and the DC voltage convertor and a second DC filter means connected between the DC voltage convertor and the power discharge inverter.

The thyristors of the DC voltage convertor are ignited in response to periodically applied ignition pulses and may be turned off by an oscillation circuit or a turn-off circuit working in conjunction with a discharge circuit.

DETAILED DESCRIPTION OF PREFERRED EMBODIMENTS

Figure 1:
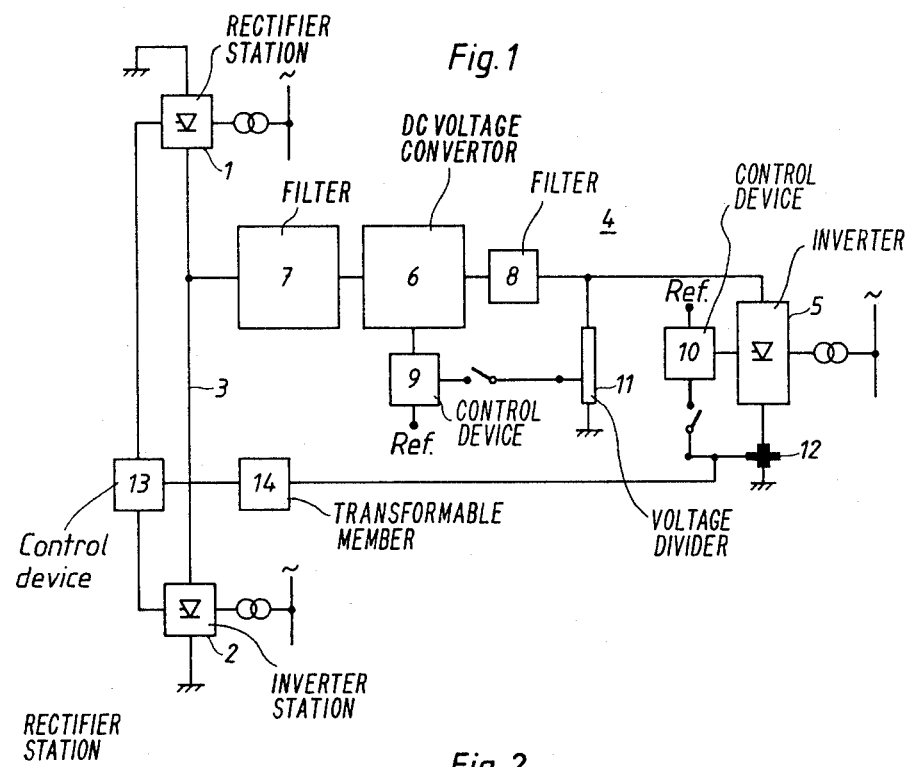
FIG. 1 shows a block diagram of an improved DC transmission circuit with a power discharge station in accordance with the invention.

The remaining portion of this specification will describe preferred embodiments of the invention when read in conjunction with the attached drawings, in which like reference characters identify identical apparatus.

FIG. 1 shows a DC transmission comprising at least two converter stations (one recitifer station and one inverter station) 1, 2, connected to a DC line 3. A third station 4 is connected to the line 3 to draw power from the line. It should be understood that the three stations are normally connected to AC networks.

Station 4 has an inverter 5 and a DC voltage convertor 6 for reducing the DC voltage of the line 3 to a level that allows a reasonable dimensioning of the inverter in relation to its rated power. The DC voltage converter is provided with a smoothing filter 7 on its input side and another smoothing filter 8 on its output side towards the inverter 5. The filter 7 may be a DC filter, for exmple, as disclosed in the Swedish Pat. No. 134,397. The filter 8 is shown in more detail in FIG. 2.

The DC voltage convertor 6 and the inverter 5 are provided with respective control devices 9 and 10. The devices 9 and 10 may be operated by voltage and current-sensing members for the inverter, for example, a voltage divider 11 and a current transductor 12.

The control device 9 may be operated by the voltage divider 11 that responds to a certain desired DC voltage on the inverter, whereas the control device 10 may be operated by the transductor 12 that responds to a certain desired DC current in the inverter 5. Alternatively, the control device 9 may be operated by the current transductor 12 and the control device 10 may be operated by the voltage divider 11.

The transmitted power between the stations 1 and 2 is controlled in a manner known to the art by a common control device 13, that defines a certain margin between the current orders of the stations. Of course, since due allowance must be made for the current that is discharged in the station 4, the signal from the transducer 12 is also applied to the control device 13, for example, through a transformable member 14. Thus, the current in 12 is transformed to the voltage level of the line 3.

Of course, the member 14 essentially represents a means for adapting different signals to the same voltage level. Such a function may be provided by suitable modifications, known to the art, of the transducer 12 or by discharging the signals at suitable resistance values.

If the rated power of the inverter 5 is small in relation to the stations 1 and 2, the connection from 12 to 13 may possibly be completely omitted by choosing a current margin between 1 and 2 that is so great that it constantly contains the current that is discharged over the station 4.

Figure 2:
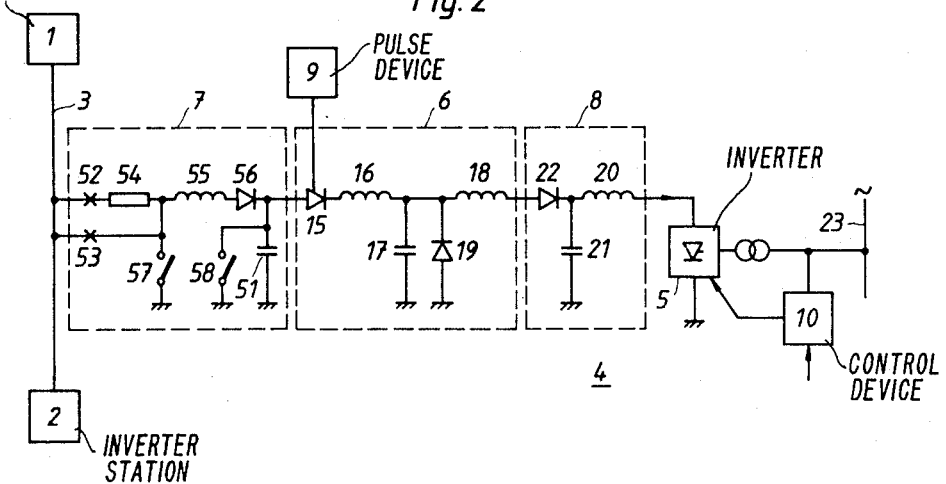
FIG. 2 illustrates a circuit diagram of the DC convertor and associated filters of the transmission apparatus of FIG. 1.

FIG. 2 shows a somewhat more detailed view of a portion of the transmission apparatus of FIG. 1. The voltage convertor 6 includes a thyristor valve 15 that is controlled by the pulse device 9 and a turn-off oscillating circuit that has a reactor 16 and a capacitor 17. The thyristor valve 15 must contain as many series-connected thyristors as is necessary to handle the desired voltge reduction from the line 3 to the inverter 5. In addition, the convertor 6 has an output reactor 18 with a freewheeling diode 19. The reactance of the reactor 18 must considerably exceed the reactance of the reactor 16, for examle by a power of ten, in order to ensure that the capacitor 17 is charged to the desired voltage within a reasonable time.

The filter 8 may be a simple DC voltage filter having a smoothing reactor 20 and a smoothing capacitor 21. The filter 8 ensures that the dimensions of the reactor 18 are moderate. A diode 22 is connected in the filter 8 to prevent the capacitor 21 from being discharged back to the capacitor 17.

The filter includes a capacitor 51 and a reactor 55 as well as a diode 56 that is placed to prevent the capacitor 51 from being discharged to the line 3 if there is a voltage drop-out on the line. In order to avoid switching overvoltages due to the charging of the capacitor 51 when the station 4 is switched into the line, the station 4 is initially switched over a circuit-breaker 52 that is connected in series with a resistor 54. When the capacitor 51 has been charged, the resistor 54 may be short-circuited with the circuit-breaker 53 and thereafter, the circuit-breaker 52 may be opened.

The station 4 may be disconnected from the line by opening the circuit-breaker 53, provided that it is a DC circuit-breaker. Otherwise, the station 4 may be disconnected by first closing the circuit breaker 57 to cause the line voltage to be reduced to zero and thereafter opening the circuit-breaker 53. After the station 4 is disconnected, the capacitor 51 may be discharged over the circuit-breaker 58.

Figure 3A:
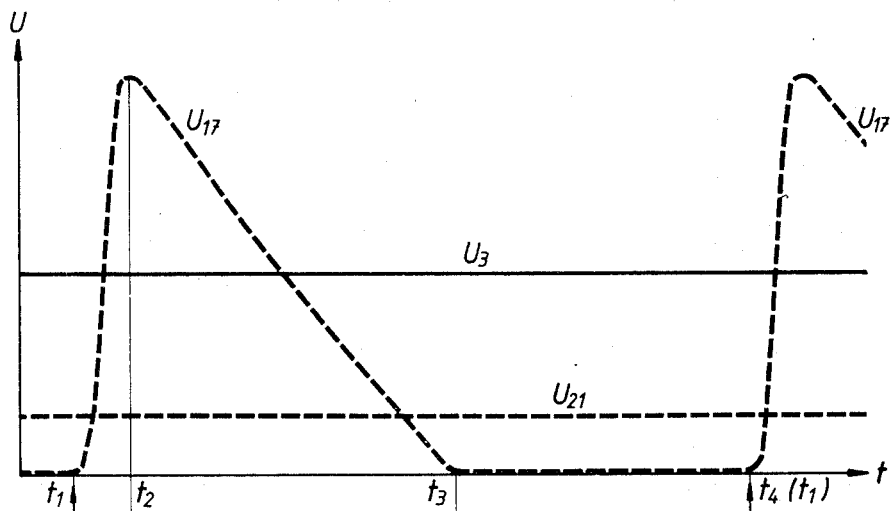
FIG. 3A illustrates a plot of the output voltages for the DC convertor and a DC output filter in the circuit of FIG. 2.
Figure 3B:
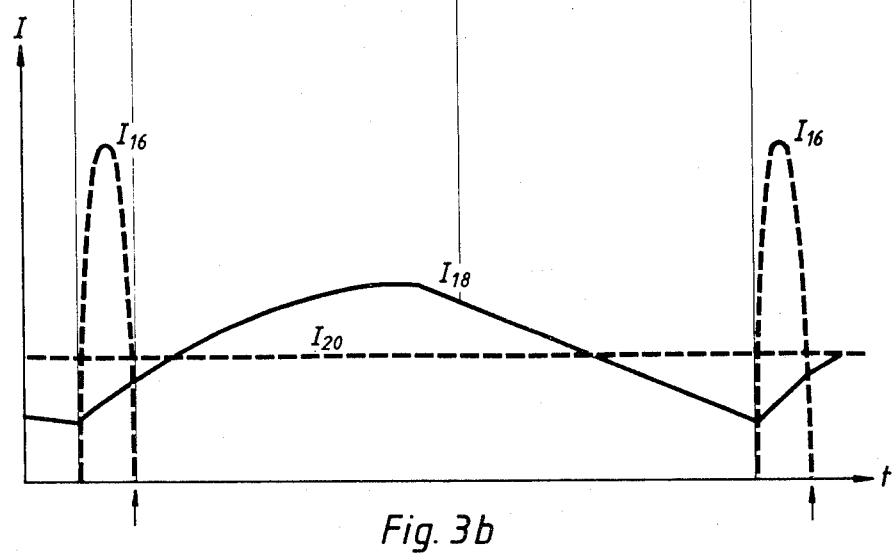
FIG. 3B illustrates a plot of the operational current for the circuit of FIG. 2.

FIG. 3a shows the voltages at different locations of the circuit of FIG. 2 and FIG. 3b shows the corresponding currents.

If line voltage $U_3$ is constant, at a time $t_1$ the valve 15 is ignited and a current pulse $I_{16}$ is generated in the reactor 16 to charge the capacitor 17 to a voltage $U_{17}$. Thereafter, at a time $t_2$ the capacitor 17 is charged to the maximum voltage $U_{17}$, the charging current $I_{16}$ becomes zero and the valve 15 is turned off. Then the charged capacitor 17 is discharged over the reactor 18 to generate a current $I_{18}$ to the capacitor 21. At a time $t_3$, the capacitor 17 is discharged and the diode 19 takes over the current to the reactor 18 up to a time $t_4$ at which the thyristor valve 15 is ignited and the voltage $U_{17}$ and current $I_{16}$ begin to rise again.

It should be appreciated that due to the smoothing in the reactors 18 and 20 and the filter capacitor 21, the capacitor voltage $U_{21}$ and the reactor current $I_{20}$ to the inverter 5 are relatively constant.

The valve 15 is controlled from the pulse device 9 with short pulses, that is pulses that are shorter than the constant interval $t_1-t_2$. By changing the frequency of the control pulses, the frequency of the charging pulses $U_{17}$ to the capacitor 17 is changed, and, thus, the average voltage $U_{21}$ on the capacitor 21 and/or the average current $I_{20}$ in the reactor 20 are also changed. As mentioned previously, the pulse device 9 is controlled by either the magnitude of $U_{21}$ or $I_{20}$ and the device 10 of the inverter 5 is controlled by either the magnitude of $U_{21}$ or $I_{20}$.

Figure 4:
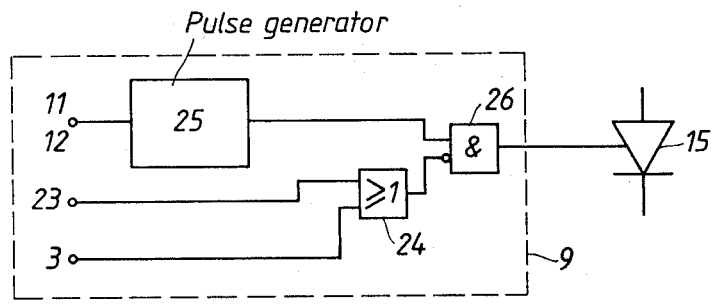
FIG. 4 illustrates a more detailed block diagram of the pulse device of FIGS. 1 and 2.

In FIG. 4, the control device 9 is shown in somewhat more detail. The control device 9 comprises a pulse device 25 that generates electrical pulses in a manner known to the art and that is operated from 11 or 12 and controlled by a safety circuit 24 that is connected to the DC line 3 and the AC network line 23 of the inverter 5. The safety circuit 24 comprises an OR-gate that delivers a signal in response to a fault signal on line 3 or line 23. The signal for the circuit 24 is applied to a negative input on an AND gate 26 and the other input of the AND gate 26 is provided by the pulse device 25. Thus, the pulses from the pulse device 25 are blocked by a signal from the safety circuit 24.

Figure 5:
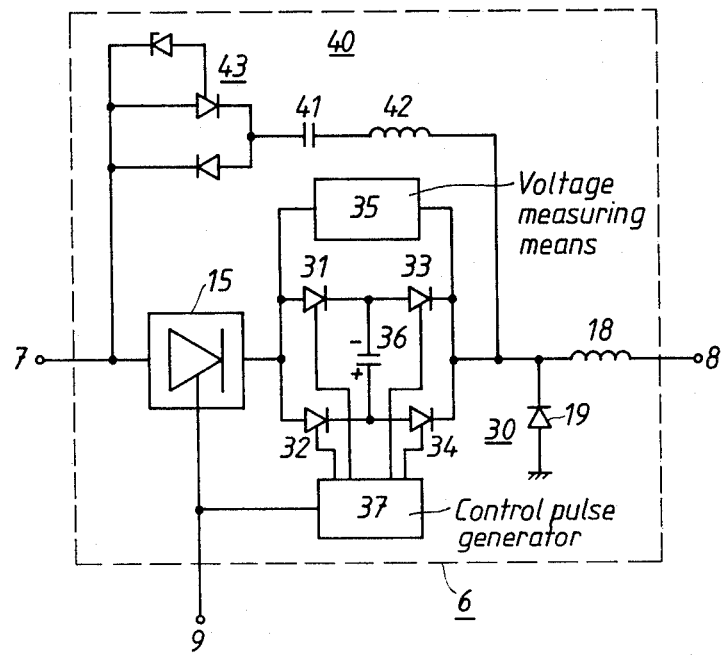
FIG. 5 illustrates an alternate embodiment of the DC voltage convertor in accordance with the invention.

FIG. 5 shows another embodiment of the voltage convertor 6. The thyristor 15 is in this case connected in series with a turn-off circuit 30 and in parallel with a discharging circuit 40. The turn-off circuit 30 includes a thyristor bridge having four branches 31-34 that are connected in parallel with a voltage measuring member 35 and are provided with a commutating capacitor 36 and a control device 37.

The discharging circuit 40 includes a capacitor 41 connected in series with a reactor 42 and a valve 43 having a voltage-controlled thyristor connected in opposed relation with a diode. In this case, control pulses are needed to ignite the thyristor 15 at $t_1$ and to activate the turn-off circuit 30 at $t_2$, as shown in FIG. 3.

The control pulse for the thyristor valve 15 is also applied to the control device 37 for the turn-off circuit, in order to initially ignite two diagonally opposite thyristors, for example 32 and 33, and to charge a capacitor 36 at the indicated polarity. When a certain trigger voltage has been generated across the member 35, the thyristor 31 is ignited and the current passes directly through the thyristors 15, 31 and 33.

Thereafter, when the valve 15 is to be extinguished at the time $t_2$, the thyristor 34 is ignited, the thyristor 33 thus being extinguished by the discharging capacitor 36. Upon continued recharging of the capacitor 36, the voltage grows until the valve 43 is ignited, the current is commutated over to the discharging circuit 40 and the thyristor valve 15 is extinguished.

It will be appreciated by those skilled in the art that the available choice of circuit components may determine whether the embodiment of FIG. 2 or of FIG. 5 is preferable for a particular application. Also, it should be understood that other known DC voltage convertors and turn-off circuits may be employed without departing from the spirit of the invention. For example, the thyristor valve 15 could possibly be provided with turn-off thyristors. In addition, if the transmission line 3 in FIG. 1 is a bipolar line, the station 4 may be provided with necessary pole-changing switches so that it may be arbitrarily connected to one or the other of the poles of the transmission line.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. Improved transmission apparatus for high-voltage direct current of a type wherein at least one rectifier station and one inverter station are connected on a DC line having a particular line voltage and a discharge station is used to discharge power from the DC line, the improvement comprising:

inverter means for said discharge station connected to said DC line through a DC voltage convertor means, said inverter means having means for operating at a direct voltage that is substantially less than said particular line voltage.

2. The transmission apparatus of claim 1 including DC filter means connected between said inverter means and said DC voltage convertor means.

3. The transmission apparatus of claim 2 wherein said DC filter means includes an input diode means connected in series with a reactor means and in parallel with a capacitor means, said diode means preventing the discharge of said capacitor means to said DC voltage convertor means.

4. The transmission apparatus of claim 1 including a DC filter means connected between said DC line and said DC voltage convertor means.

5. The transmission apparatus of claim 4 wherein said DC filter means includes a blocking diode means connected in series with a reactor means and in parallel with a capacitor means, said diode means preventing the discharge of said capacitor means to said DC line.

6. The transmission apparatus of claim 4 wherein said DC filter means is connected to said DC line through at least two parallel switching means, one of said at least two parallel switching means connected in series with a resistor means for switching said DC voltage convertor means into connection with said DC line and avoiding associated switching overvoltages and the other parallel switching means connected to short circuit said resistor means after said DC voltage convertor means is connected to said DC line.

7. The transmission apparatus of claim 1 wherein said DC voltage convertor means includes:
  a thyristor means for turning on to pass current in response to an ignition pulse,
  an oscillation circuit means connected to said thyristor means for turning off said thyristor means to block the flow of current, and
  output reactor means and associated diode means connected to said oscillation circuit means.

8. The transmission apparatus of claim 1 wherein said DC voltage convertor means includes:
  a thyristor means for turning on to pass current in response to an ignition pulse,
  turn-off circuit means connected in series with said thyristor means, and
  discharging circuit means connected in parallel with said thyristor means for operating to force said thyristor means to turn off to block the flow of current.

* * * * *